United States Patent
Garrido et al.

(10) Patent No.: US 11,270,411 B1
(45) Date of Patent: Mar. 8, 2022

(54) EFFICIENT HARDWARE DESIGN AND IMPLEMENTATION OF IMAGE INTERPOLATION AND RESIZING FOR IMAGE PROCESSING PIPELINE

(71) Applicant: HRL Laboratories, LLC, Malibu, CA (US)

(72) Inventors: Austin F. Garrido, Northridge, CA (US); Shankar R. Rao, Agoura Hills, CA (US); Jose Cruz-Albrecht, Oak Park, CA (US); Timothy J. Derosier, Colorado, CO (US)

(73) Assignee: HRL Laboratories, LLC, Malibu, CA (US)

( * ) Notice: Subject to any disclaimer, the term of this patent is extended or adjusted under 35 U.S.C. 154(b) by 489 days.

(21) Appl. No.: 16/369,779

(22) Filed: Mar. 29, 2019

Related U.S. Application Data

(60) Provisional application No. 62/679,610, filed on Jun. 1, 2018.

(51) Int. Cl.
*G06T 3/40* (2006.01)
*G06F 1/324* (2019.01)
*G06T 1/60* (2006.01)

(52) U.S. Cl.
CPC ............ *G06T 3/4007* (2013.01); *G06F 1/324* (2013.01); *G06T 1/60* (2013.01); *G06T 3/4023* (2013.01)

(58) Field of Classification Search
None
See application file for complete search history.

(56) References Cited

U.S. PATENT DOCUMENTS

| | | | |
|---|---|---|---|
| 2005/0035981 A1* | 2/2005 | Ozaki | G09G 3/20 345/690 |
| 2015/0317544 A1* | 11/2015 | Saito | G06T 11/001 358/2.1 |

(Continued)

OTHER PUBLICATIONS

"Bilinear Image Scaling"—Tech-Algorithm.com—Jun. 2009, pp. 1-8 (Year: 2009).*

(Continued)

*Primary Examiner* — Bernard Krasnic
(74) *Attorney, Agent, or Firm* — Ladas & Parry

(57) ABSTRACT

A system for real time bilinear interpolation includes a bilinear interpolation module capable of: generating pixel addresses for original image pixels of an original image needed for performing bilinear interpolation of the original image to form a resized image, wherein the generated pixel addresses assume all the original image pixels of the original image are accessible, and performing bilinear interpolation, and a pixel smart memory module capable: of sequentially receiving original image pixel rows of the original image an original image pixel row a time, predicting which original image pixel rows are needed for performing bilinear interpolation, storing only the needed sequentially received original image pixel rows in a memory, decoding the generated pixel addresses to form decoded addresses to access the needed original image pixel rows stored in the memory, and sending the needed original image pixel rows to the bilinear interpolation module for performing bilinear interpolation.

17 Claims, 19 Drawing Sheets

(56) References Cited

U.S. PATENT DOCUMENTS

2018/0122450 A1\* 5/2018 Berger ................ G11C 11/1657
2020/0137335 A1\* 4/2020 Oh ........................ H04L 9/3247

OTHER PUBLICATIONS

Gour, P., "Hardware Accelerator for Real-Time Image Resizing," 2014 18th International Symposium on VLSI Design and Test (6 pages).
Mishra, G., "Real-Time Image Resizing Hardware Accelerator for Object Detection Algorithms," 2013 International Symposium on Electronic System Design, pp. 98-102.

\* cited by examiner

EFFICIENT HARDWARE DESIGN AND IMPLEMENTATION OF IMAGE INTERPOLATION AND RESIZING FOR IMAGE PROCESSING PIPELINE

CROSS REFERENCE TO RELATED APPLICATIONS

This application is related to and claims priority from U.S. Provisional Patent Application Ser. No. 62/679,610, filed Jun. 1, 2018, which is incorporated herein by reference as though set forth in full.

STATEMENT REGARDING FEDERAL FUNDING

This invention was made under U.S. Government DARPA Contract No. HR0011-13-C-0052. The U.S. Government has certain rights in this invention.

TECHNICAL FIELD

This disclosure relates to image processing, and object detection and identification.

BACKGROUND

For real time video frame rates, an image processing pipeline (IPP) should have sufficient throughput to keep up with at least a 30 Hz frame rate, while keeping power usage of the IPP to a minimum. In the prior art, image interpolation and resizing has been implemented either in software or in hardware with system on chip (SoC) designs. Such implementations assume that arbitrary pixels in the image can be accessed at any time, which creates memory access issues. The prior art designs are also not agile enough to perform interpolation required by an IPP in real time.

Methods of performing bilinear interpolation in hardware are described in "Real-Time Image Resizing Hardware Accelerator for Object Detection Algorithms" by Gaurav Mishra, Yan Lin Aung, Meiqing Wu, Siew-Kei Lam, and Thambipillai Srikanthan 2013 International Symposium on Electronic System Design (hereafter Mishra). They perform bilinear interpolation using SoCs and assume no overhead in the image processing pipeline. Their pipeline structure does not address memory issues and timing constraints that need to be met in an image processing pipeline.

Techniques for hardware implementation of a bilinear interpolation-like design are discussed in "Hardware Accelerator for Real-Time Image Resizing" by Pranav Narayan Gour, Sujay Narumanchi Sumeet Saurav, and Sanjay Singh 2014 18th International Symposium on VLSI Design and Test (hereafter Gour). They describe a smart memory module, which is a smart shift register that keeps a window of pixel locations for later use by the calculation module. The method has not been implemented in hardware nor shown to process images at real time video frame rates.

A practical image processing pipeline performs many more operations than just interpolation, and thus has more resource and timing constraints than either Mishra or Gour assume. In addition, their designs require more fabric resources to implement interpolations, which require more space and power, thus resulting in less space and power to add additional IPP operations.

What is needed is an efficient implementation and hardware design for image interpolation in an image processing pipeline that is capable of processing real time video frame rates. The embodiments of the present disclosure answer these and other needs.

SUMMARY

In a first embodiment disclosed herein, a system for real time bilinear interpolation comprises a bilinear interpolation module capable of generating pixel addresses for original image pixels of an original image needed for performing bilinear interpolation of the original image to form a resized or rescaled image, wherein the generated pixel addresses assume all the original image pixels of the original image are accessible, and performing bilinear interpolation of the original image pixels of the original image to form interpolated pixels for the resized or rescaled image, and a pixel smart memory module capable of sequentially receiving original image pixel rows of the original image an original image pixel row a time, and predicting which original image pixel rows are needed for performing bilinear interpolation of the original image pixels of the original image to form interpolated pixels for the resized or rescaled image, storing only the needed sequentially received original image pixel rows in a memory, decoding the generated pixel addresses to form decoded addresses to access the needed original image pixel rows stored in the memory, and sending the needed original image pixel rows to the bilinear interpolation module for performing bilinear interpolation.

In another embodiment disclosed herein, a method for real time bilinear interpolation comprises generating pixel addresses for original image pixels of an original image needed for performing bilinear interpolation of the original image to form a resized or rescaled image, wherein the generated pixel addresses assume all the original image pixels of the original image are accessible, sequentially receiving original image pixel rows of the original image an original image pixel row a time, predicting which original image pixel rows are needed for performing bilinear interpolation of the original image pixels of the original image to form interpolated pixels for the resized or rescaled image, storing only the needed sequentially received original image pixel rows in a memory, decoding the generated pixel addresses to form decoded addresses to access the needed original image pixel rows stored in the memory, accessing from the memory the needed original image pixel rows, and performing bilinear interpolation on the accessed needed original image pixel rows to form interpolated pixels for the resized or rescaled image.

These and other features and advantages will become further apparent from the detailed description and accompanying FIGS. that follow. In the FIGS. and description, numerals indicate the various features, like numerals referring to like features throughout both the drawings and the description.

BRIEF DESCRIPTION OF THE DRAWINGS

FIG. 17A shows a Matlab result, FIG. 17B shows an error result, and FIG. 17C shows a result from the hardware in accordance with the present disclosure;

FIG. 18A shows a Matlab result, FIG. 18B shows an error result, and FIG. 18C shows a result from the hardware in accordance with the present disclosure; FIG. 19A shows a Matlab result, FIG. 19B shows an error result, and FIG. 19C shows a result from the hardware in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
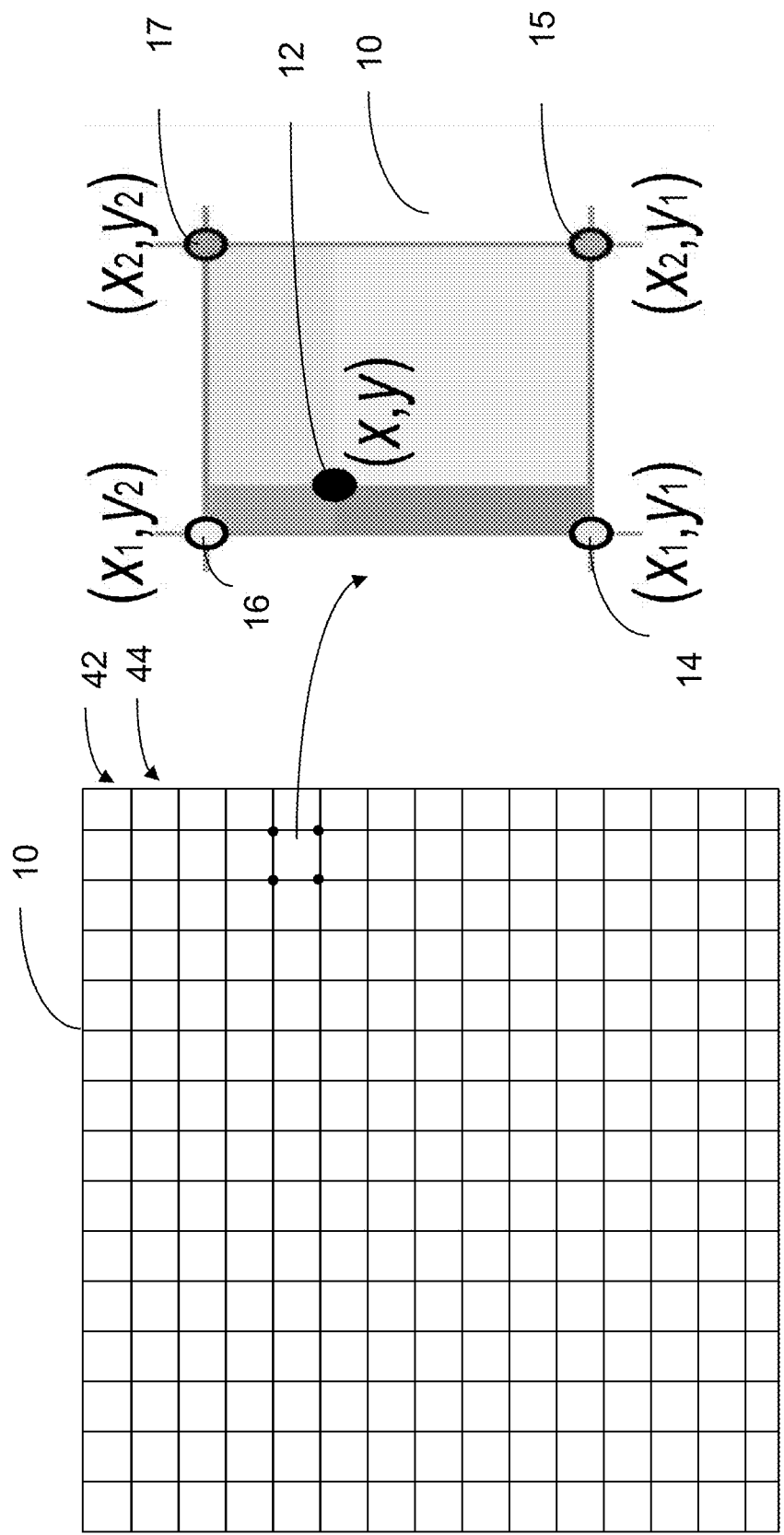
FIG. 1A shows an original image or a portion of an original image with rows and columns of pixels.
FIG. 1B shows a visual representation of an interpolated pixel for a resized image created using bilinear interpolation in accordance with the present disclosure.

After an image is captured, the original image, such as that shown in FIG. 1A having an array of pixels 10, may be resized/rescaled using a method called bilinear interpolation. Bilinear interpolation is performed by approximating new pixel values, such as the pixel at X,Y 12, shown in FIG. 1B, which is a pixel in the resized/rescaled image. The pixel at X,Y 12 is derived from pixels X1,Y1 14, X2,Y1 15, X1,Y2 16, and X2,Y2 17 in the original image, as shown in FIG. 1B. FIG. 1B shows only one interpolated pixel X,Y, and only four original pixels, however, a person skilled in the art would understand that the original image, as well as the resized/rescaled image may have millions of pixels.

Equation 1 below is used to derive the interpolated new pixel value 12 at X,Y:

$$A(1-xdiff)(1-ydiff)+B(xdiff)(1-ydiff)+C(ydiff)(1-xdiff)+D(xdiff)(ydiff)=\text{NewPixel} \quad \text{Equation 1}$$

where NewPixel=pixel value at resized image location (current_x_location, current_y_location);

where A=pixel value at (x_original, y_original) (reference number 14);

where B=pixel value at (x_original+1, y_original) (reference number 15);

where C=pixel value at (x_original, y_original+1) (reference number 16);

where D=pixel value at (x_original+1, y_original+1) (reference number 17);

where current_x_location, current_y_location is the coordinate of the pixel value for the new resized image;

wherein (x_original, y_original), (x_original+1, y_original), (x_original, y_original+1), (x_original+1, y_original+1) are coordinates of pixels in the original image;

where X_Factor=start width of original image/end width of resized image;

where Y_Factor=start height of original image/end height of resized image where x_F=X_Factor current_x_location;

where y_F=Y_Factor current_y_location;

where x_original=min(floor(x_F), start width of original image−1), where the floor function rounds down to the nearest integer value;

where y_original=min(floor(y_F), start height of original image−1), where the floor function rounds down to the nearest integer value;

where xdiff=x_F—x_original; and where ydiff=y_F—y_original.

The function floor( ) is a function that rounds down to the nearest integer value. The function min( ) picks the smaller between the listed items. Hence, for example, for the expression x_original=min(floor(x_F), width of original image−1), if x_F equals 33.5 the floor function would round this down to 33. If the (width of original image−1)=44, since 33 is less than 44, x original in this example equals 33.

Given an environment, such as a processor, to run code and a captured image, the above pseudo code can be used to resize/rescale an image to any size. However, software post processing on a processor does not easily translate to real time processing. One of the fundamental parts of the algorithm relies heavily on memory access for different pixel values which potentially could be far apart from previous memory accesses. Thus, the algorithm may incur many memory access delays to complete the function. For non-real time applications this delay is negligible; however, for a real time imaging pipeline, memory access delays are a significant issue.

The present disclosure describes a system for performing bilinear interpolation of an image, which may be implemented in hardware, such as with a field programmable gate array (FPGA). The described system is designed to carry out this functionally as part of an image processing pipeline (IPP) that processes image frames at a rate of 30 frames per second. The design provides the throughput needed to keep up with a 30 Hz frame rate constraint, while keeping power usage to a minimum. The design of the present disclosure efficiently manages the bilinear interpolation memory access bottleneck, thus maximizing throughput of the IPP pipeline, while simultaneously minimizing power usage.

Figure 2:
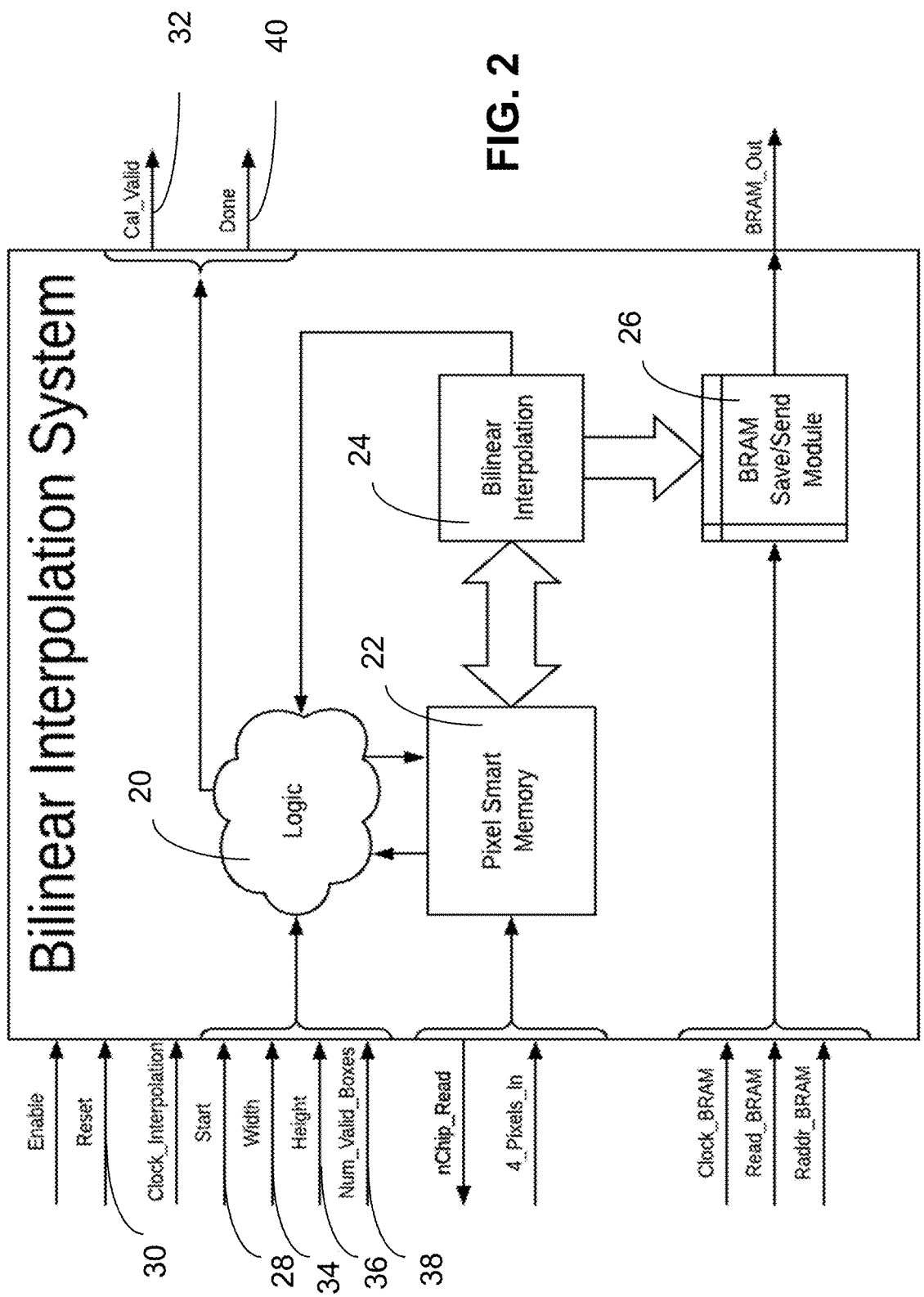
FIG. 2 shows an overview of bilinear interpolation implemented in hardware in accordance with the present disclosure.

The bilinear interpolation system of the present disclosure, which is shown in FIG. 2, has a logic module 20, a pixel smart memory module 22, a bilinear interpolation module 24, and a block random access memory (BRAM) save/send module 26.

The bilinear interpolation system may use optional clock gating to reduce power when inactive in the image processing pipeline. The logic module 20 provides clocks which control the calculations for the bilinear interpolation module 24 and the read back of completed calculations which are stored in the BRAM module 26. When there is no need to calculate, there is an option to turn off the clock to the bilinear interpolation module 24 to reduce power consumption. The clocks for read back of completed calculations from the BRAM 26 may also be turned off, when not needed to save power.

The logic module 20 receives a start pulse 28 to start the bilinear interpolation and a reset pulse 30 to reset the bilinear interpolation system when the image resizing/rescaling is complete. The logic module 20 also sends status and control signals, such as Cal Valid signal 32 and Done signal 40, to other modules in the IPP.

Figure 15:
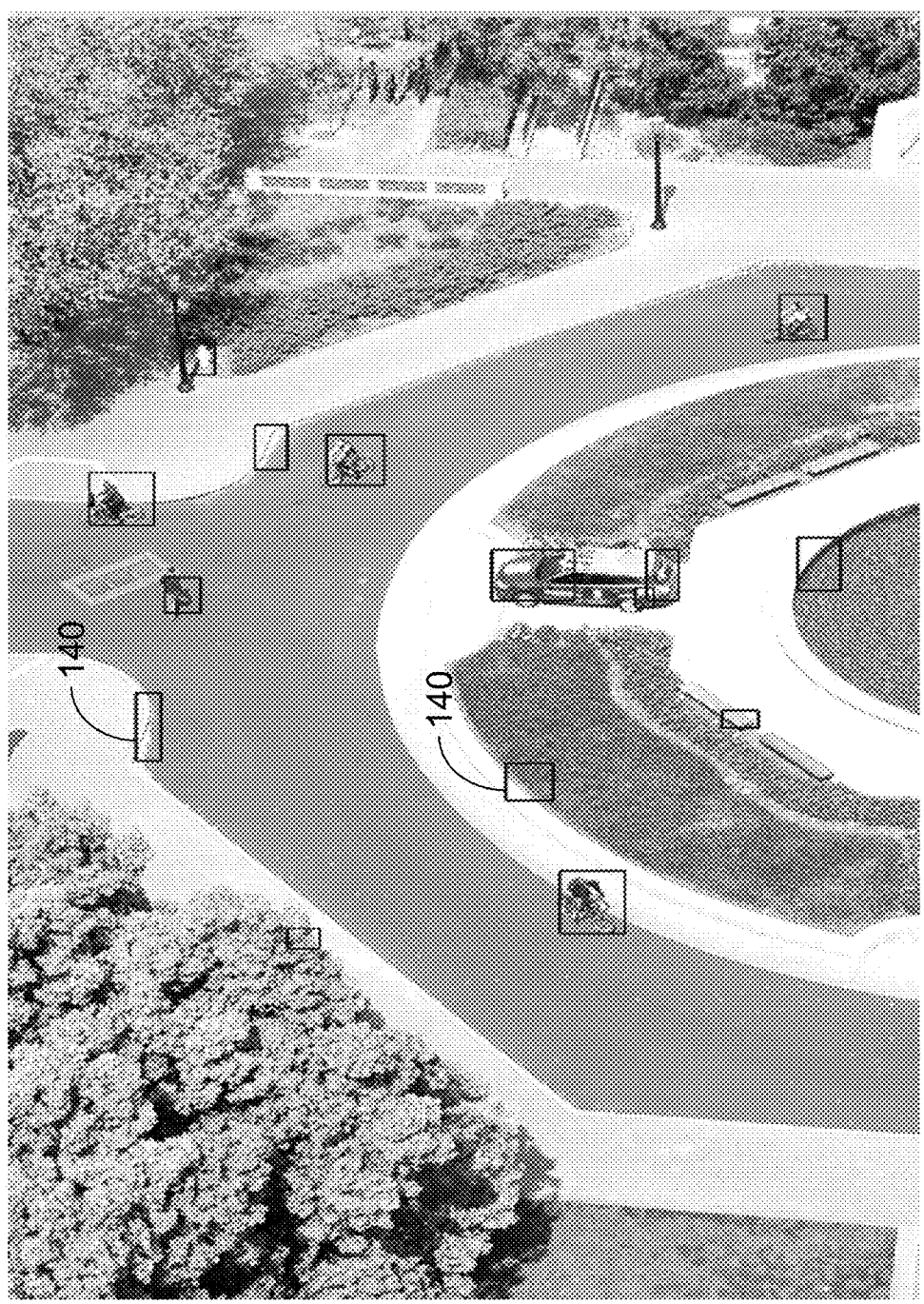
FIG. 15 shows boxes over areas of interest to further process in accordance with the present disclosure.

The bilinear interpolation system operates on pixel in areas of interest, which the image processing system has already found. FIG. 15 shows an image with areas of interest identified by boxes 140. There can be many areas of interest, for example 15 areas of interest. With 15 areas of interest there are 15 original images to resize/rescale using the bilinear interpolation system shown in FIG. 2.

Figure 3:
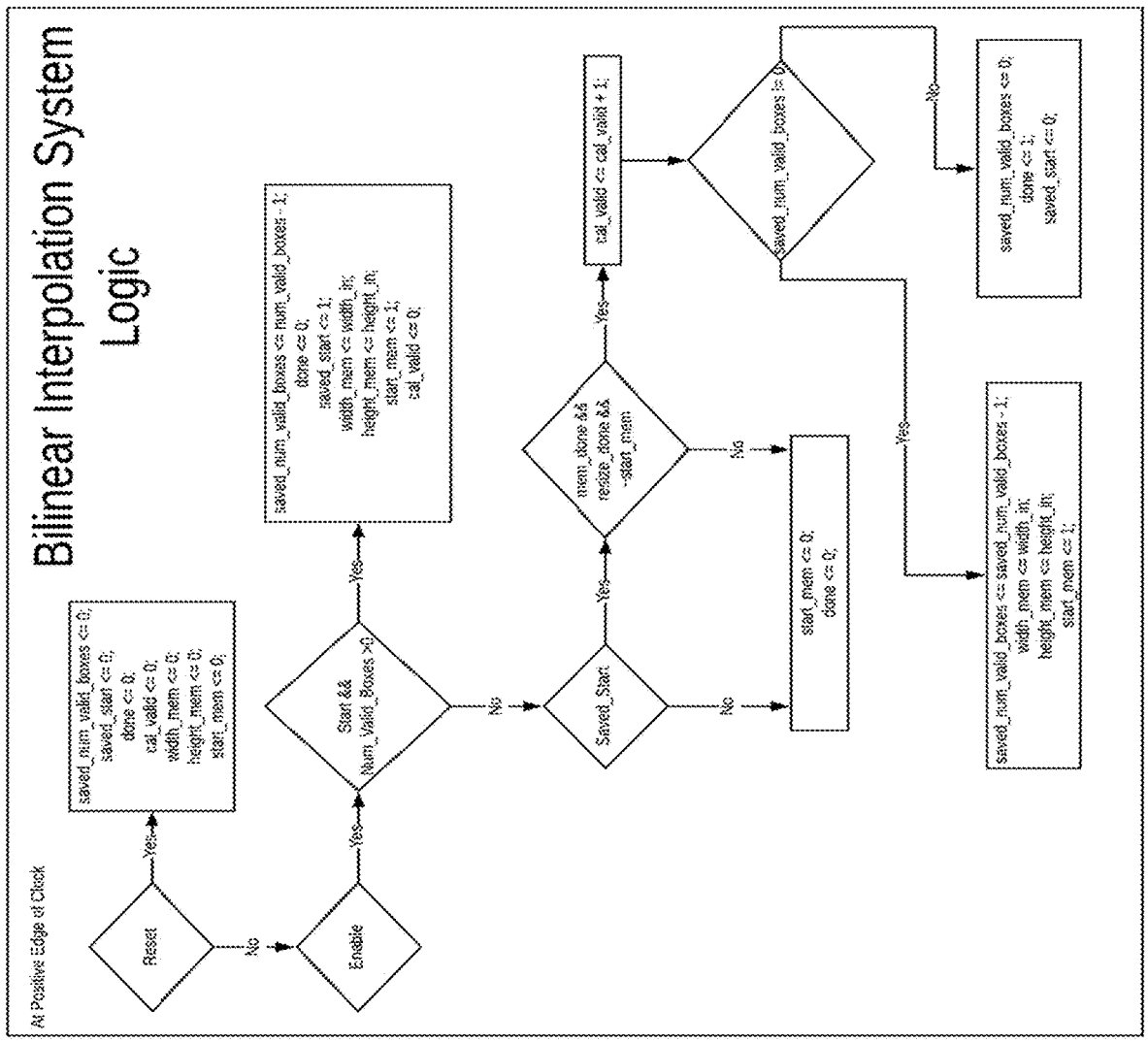
FIG. 3 shows a detailed view of a bilinear interpolation system logic module in accordance with the present disclosure.

The bilinear interpolation system is started by initial start pulse 28, which is received by the logic module 20 along with the width 34 and height 36 of the first image to process. Also, the number of areas of interest or original images to process 38 is received by the logic module 20, which uses this information to properly process the areas of interest and to report with Done signal 40 when finished resizing/rescaling the images. The logic module functions are to start the system when the start pulse 28 is received, to report finished images status, to notify when all images have completed (the Done signal 40), and to reset the logic module when the reset pulse 30 is received, as shown in the detailed flow chart in FIG. 3.

The IPP, of which the bilinear interpolation system is a part, sequentially streams in the original image an original image row at a time. For example, the entire original image pixel row 42 shown in FIG. 1A is streamed in, then the entire original image pixel row 44 shown in FIG. 1A is streamed in, and so on.

As shown in Equation 1 and FIG. 1B, the bilinear interpolation equation uses four different pixel locations 14, 15, 16 and 17 to calculate the pixel 12 value. After the first four pixels are used in Equation 1, the next original X location and/or the next original Y location for the resized image may be the next pixels in the pixel stream, use some of the same pixels as the preceding calculation, or skip several pixels in the original image. Therefore, accessing the correct pixels in the original image for the bilinear interpolation may be a problem for an image processing pipeline (IPP), because an IPP streams in 4 pixels at a time from a single image row, for example image row 42 shown in FIG. 1A, until it reaches the end of that image row, then begins streaming the next image row, for example image row 44 shown in FIG. 1A. The bilinear interpolation calculations need a minimum of two rows of the original image pixels to begin the bilinear interpolation. However, because some rows may be skipped, every row of pixel values in the original image may not be used in Equation 1 for deriving pixel values for the resized image. However, as discussed above the image pixels are read in consecutive order into the bilinear interpolation system. The present disclosure describes a method to deal with this problem efficiently so as be able to process the resized image in real time.

Figure 4:
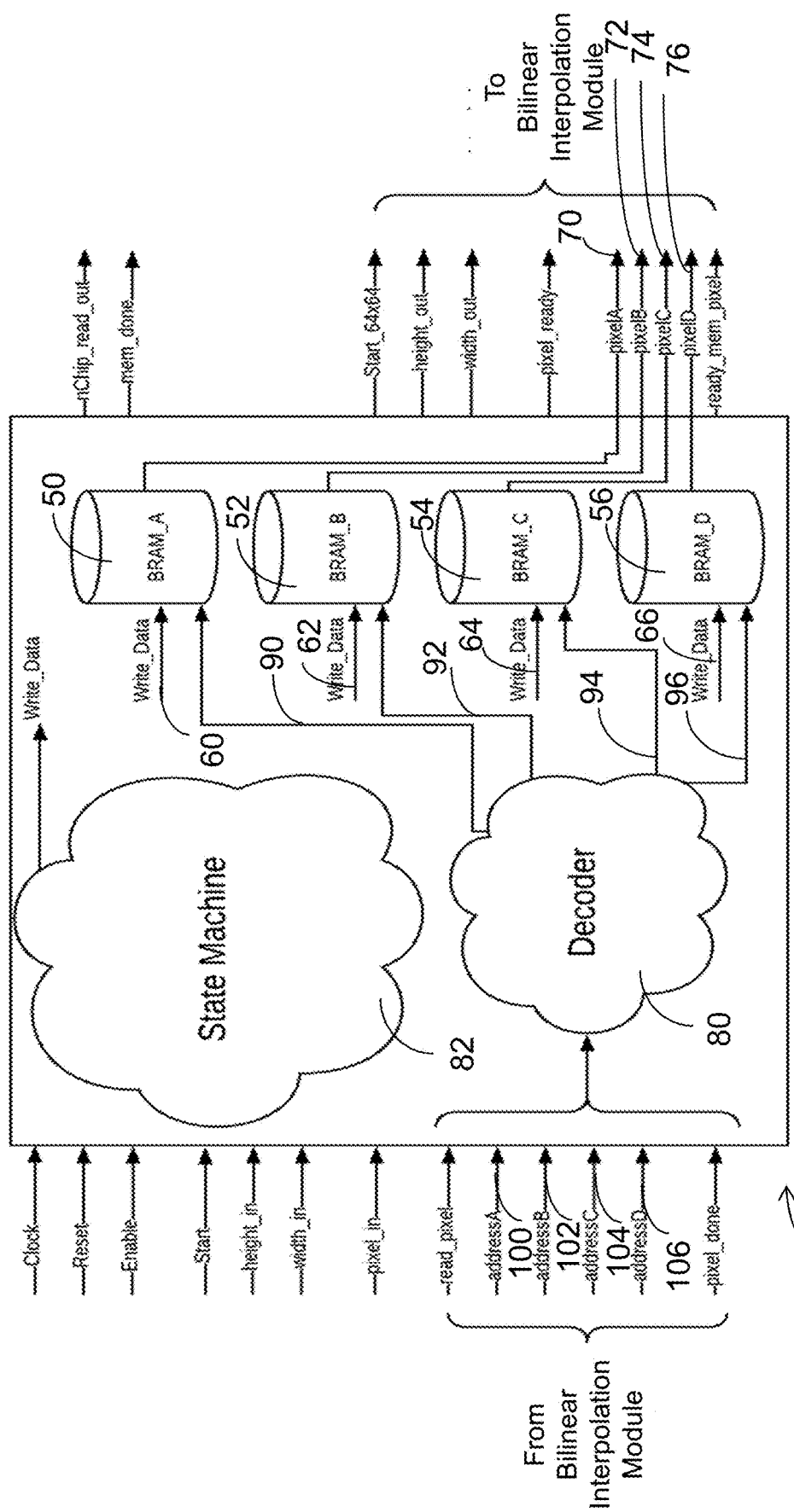
FIG. 4 shows a pixel smart module overview in accordance with the present disclosure.

The Pixel Smart Memory module 22, which is shown in more detail in FIG. 4, pre-calculates what image pixel rows are needed for the bilinear interpolation calculations. The Pixel Smart Memory module 22 includes a state machine 82, a decoder 80, and four BRAM sections 50, 52, 54 and 56, as shown in FIG. 4. The Pixel Smart Memory module 22 predicts what original image pixel rows are necessary and stores the needed pixel rows into the four BRAM sections 50, 52, 54 and 56, as shown in FIG. 4. The four BRAM sections 50, 52, 54 and 56 are part of the Pixel Smart Memory module 22 and are separate from the BRAM save/send module 26. Each of the four BRAM sections 50, 52, 54 and 56 can store one or more pixel rows. As described further below, a stored pixel row may be reused in the bilinear interpolation calculation, so the pixel smart memory module 22 accounts for that possibility.

As shown in Equation 1, four pixel locations in the original image are accessed for a bilinear interpolation calculation. A single BRAM has only one write port and one read port; however, the four sections 50, 52, 54 and 56 of the BRAM each have their own write ports 60, 62, 64 and 66, respectively, and read ports 70, 72, 74 and 76, respectively. Each BRAM section 50, 52, 54 and 56 is written via its respective write port 60, 62, 64 or 66 with identical pixel data as it streams in, in the same identical address locations as the other BRAM sections; however, the four BRAM sections 50, 52, 54 and 56 are assigned to be "A", "B", "C", or "D" BRAMS for the read address ports 70, 72, 74 and 76, as shown in FIG. 4.

The addresses 90, 92, 94 and 96, as shown in FIG. 4, sent to the four BRAM section read ports are decoded by decoder 80 in the pixel smart memory module from addresses 100, 102, 104 and 106 received from the bilinear interpolation module 24, as shown in FIG. 4. The addresses 100, 102, 104 and 106 received from the bilinear interpolation module 24 are the addresses for the needed original image pixels for interpolating the resized image assuming the entire original image can be accessed. The decoded addresses 90, 92, 94 and 96 are used to access the needed pixels from the BRAM sections 50, 52, 54 and 56 for the calculations performed by the bilinear interpolation module 24. FIG. 4 shows the inputs to and outputs from the pixel smart memory module 22.

Figure 5:
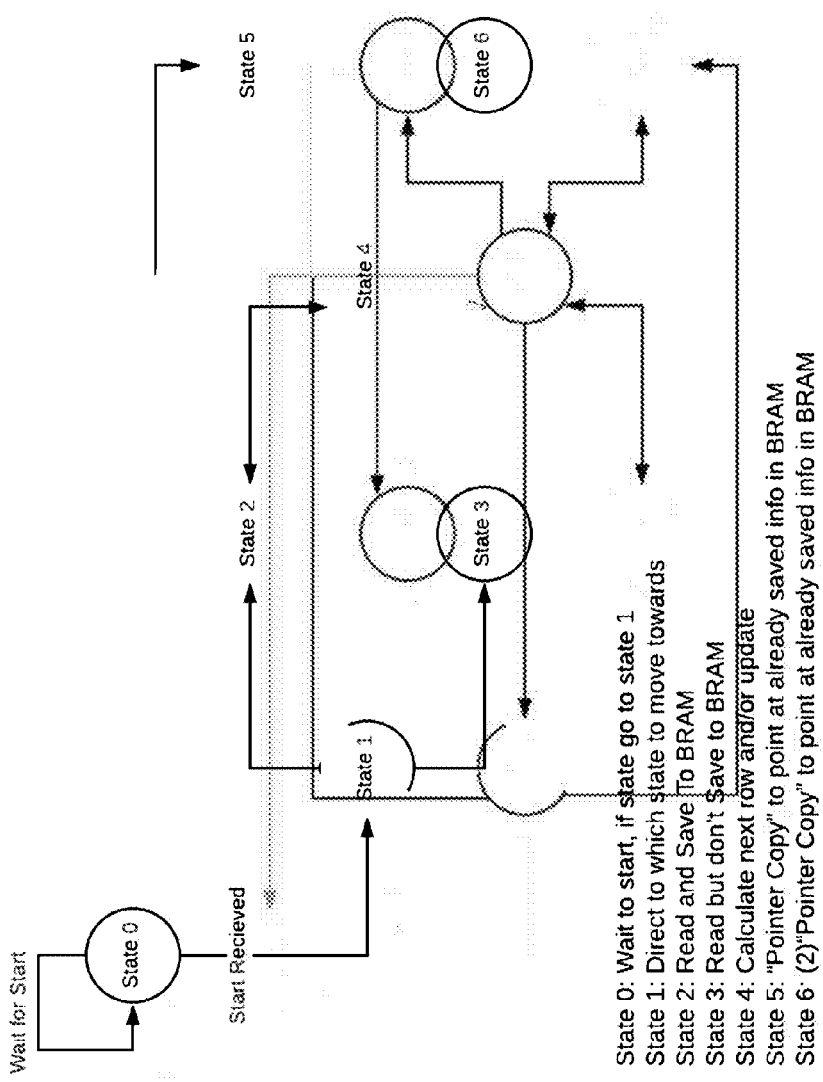
FIG. 5 shows a pixel smart module state machine overview in accordance with the present disclosure.
Figure 6:
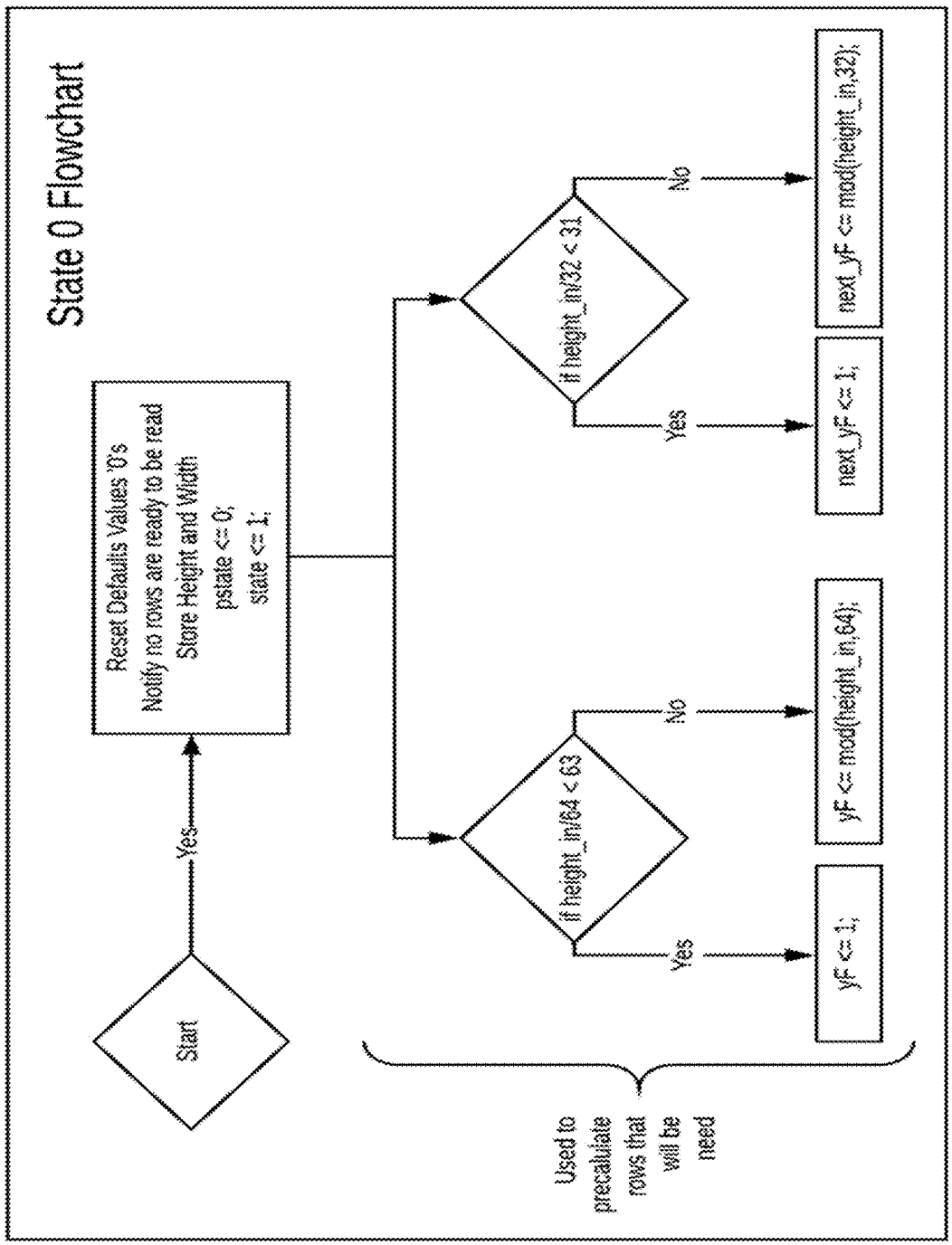
FIG. 6 shows a pixel smart memory module state 0 flowchart in accordance with the present disclosure.

FIG. 5 shows an overview of the state machine 82 in the pixel smart module 22, and shows that there are seven states of the state machine 82, states 0-6. The state machine 82 starts and ends in state 0. In state 0, the state machine 82 waits for a start pulse 28. Once the start pulse 28 is received, the pixel smart memory module 22 calculates yF for the present bilinear interpolation calculation and next_yF for the next bilinear interpolation calculation. The yF value is used to index the original image for the present bilinear interpolation calculation, while the next_yF is a pre-calculation for indexing the original image for the next bilinear interpolation calculation. These yF values, which are defined in Equation 1, are used during state 1, therefore they must be made ready for movement into state 1. FIG. 6 shows a flowchart for state 0.

Figure 7:
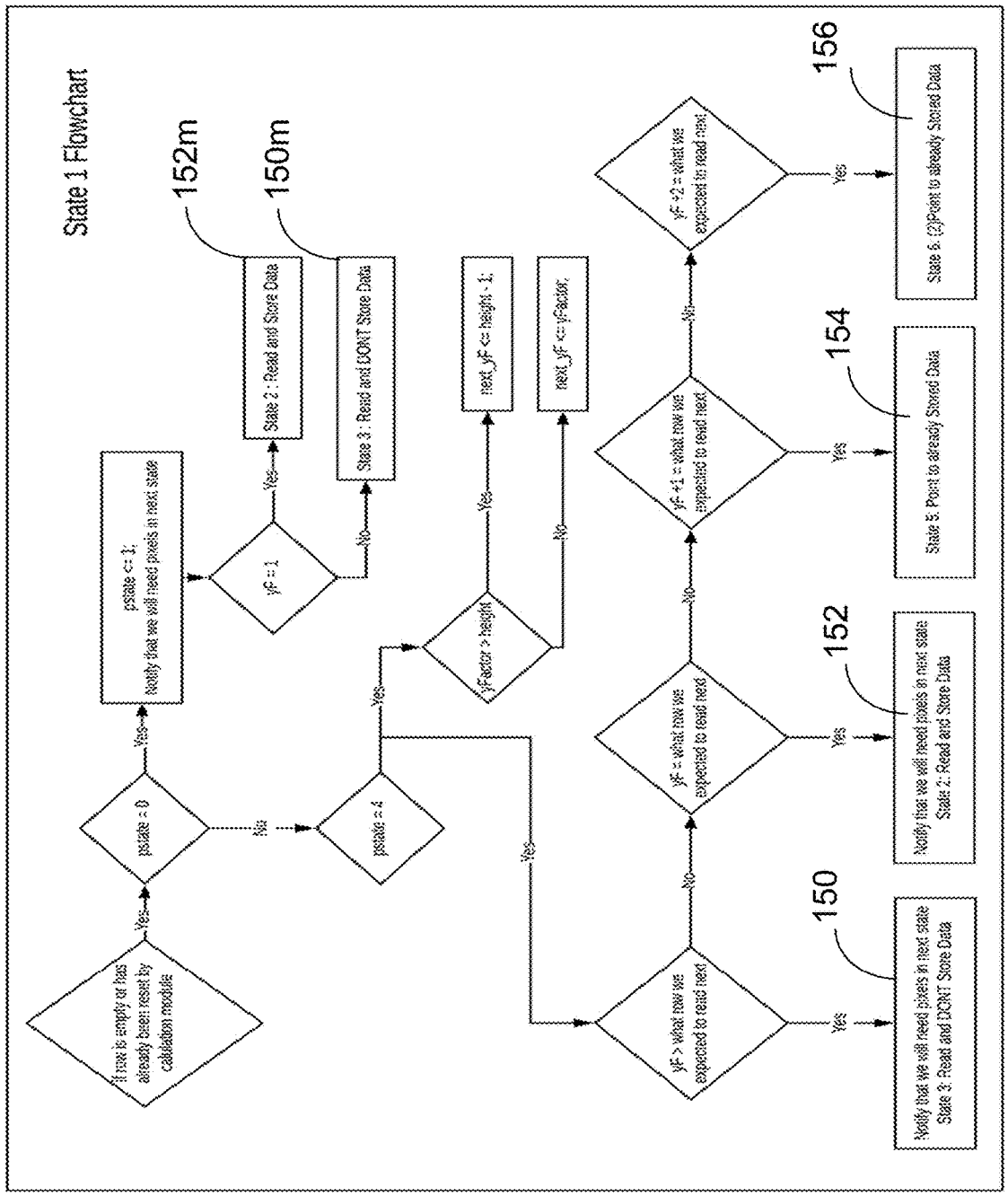
FIG. 7 shows a pixel smart memory module state 1 flowchart in accordance with the present disclosure.

State 1 is a wait state for pixel rows which have yet to be used in the bilinear interpolation. There are different possible state transition outcomes from state 1, as shown in the state 1 flow chart shown in FIG. 7. The first outcome 150 is that the pixel row expected to next stream in is for the pixel row needed and the previous state we were in was state 4, if so then the state machine goes to state 3. If the previous state was state 0 and the conditions were the same (i.e. yF>what row we expected to read next) in this case it would be 1 then the state machine would go to state 3 "150 m". The second outcome 152 is that the pixel row expected to next stream in is a needed pixel row and the previous state was state 4, if so then the state machine goes to state 2. If the previous state was state 0 and the conditions were the same (i.e. yF=what row we expect to read next) in this case it would be 1 then the state machine would go to state 2 "152 m". The third outcome 154 is that that the needed pixel row is already in BRAM, if so then the state machine goes to state 5. The fourth outcome 156 is that the next two needed pixel rows are already in BRAM memory, if so then the state machine goes to state 6.

Figure 8:
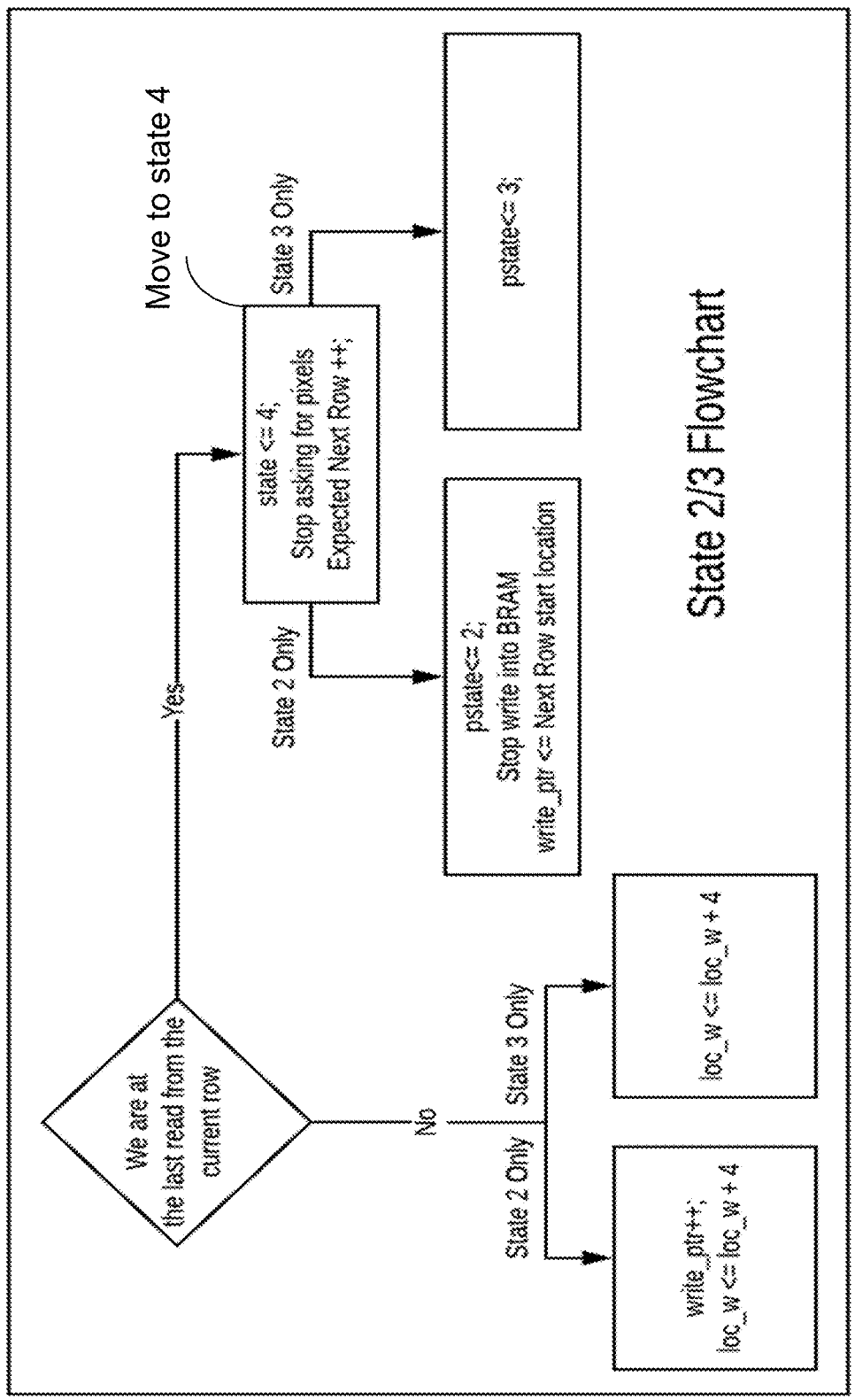
FIG. 8 shows a pixel smart memory module state 2 and 3 flowchart in accordance with the present disclosure.

States 2 and 3 are very similar, because both states ask for and have pixels streaming in. FIG. 8 shows a detailed flow chart for states 2 and 3. The difference between states 2 and 3 is that for state 2, the streaming in pixel row needs to be saved in the four BRAM sections 50, 52, 54 and 56 for later use by the bilinear interpolation module 24 for calculations. In state 3, all the pixels streaming in are discarded and not stored into the four BRAM sections 50, 52, 54 and 56, because the pixel are not needed in any calculations. Once either state 2 or 3 is finished, then the state machine goes to state 4, as shown in FIGS. 5 and 8.

Figure 9:
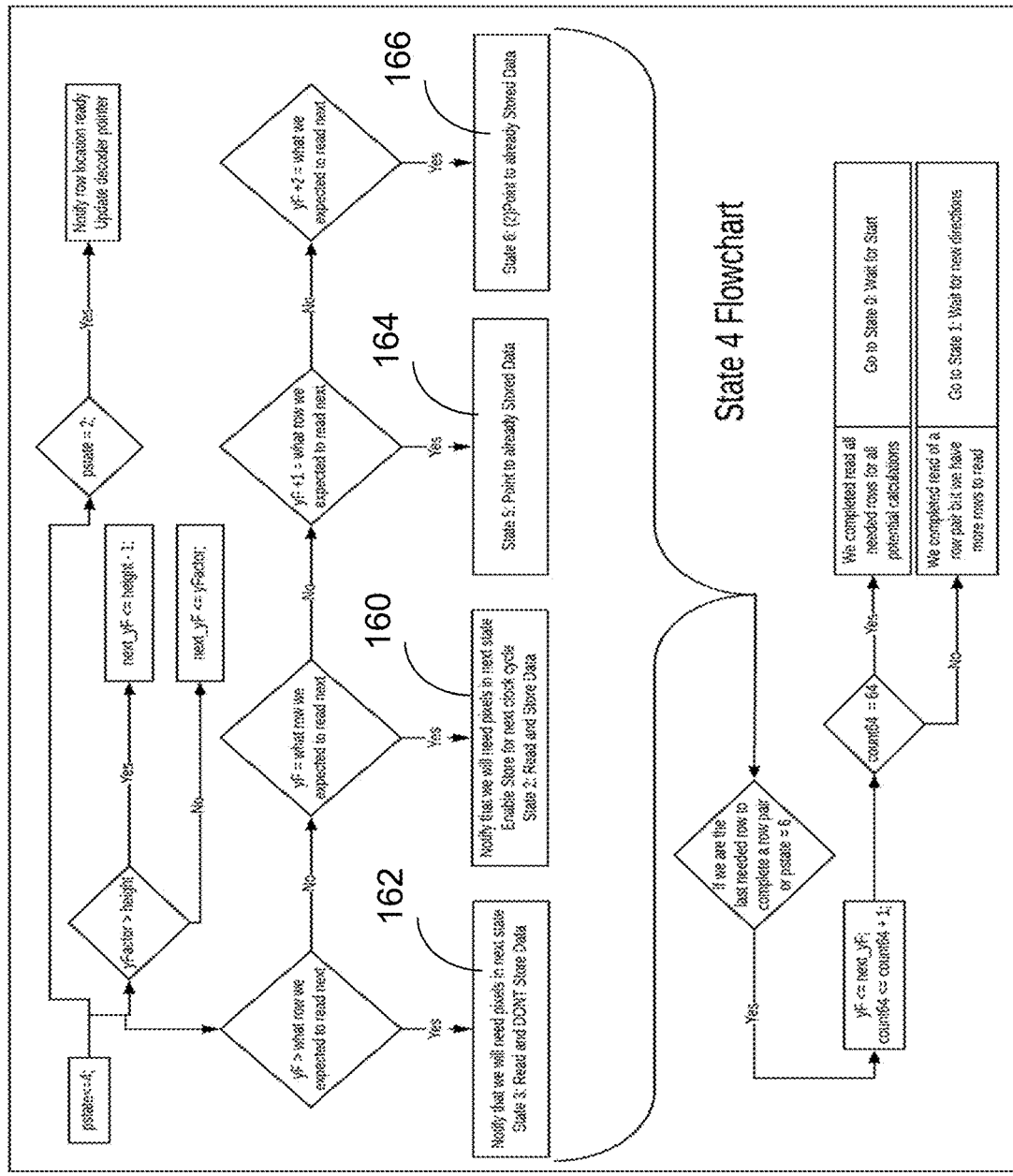
FIG. 9 shows a pixel smart memory module state 4 flowchart in accordance with the present disclosure.

Again, as discussed above with respect to Equation 1, 4 pixels are needed in the Bilinear Interpolation equation, so a minimum of 2 pixel rows of the image are needed to be stored in the four BRAM sections 50, 52, 54 and 56 to begin performing the calculations. State 4 looks to see if the second of the two needed rows has been stored into the four BRAM sections 50, 52, 54 and 56. If not, the state machine returns to state 1, or if we are the last row needed to complete all of the Bilinear Interpolation calculations the state machine goes to state 0. If the first or second of the two needed pixel rows has been stored into the four BRAM sections 50, 52, 54 and 56, then the state machine is set to the correct state 2 in step 160, state 3 in step 162, state 5 in step 164, or state 6 in step 166, as shown in FIG. 9.

Figure 10:
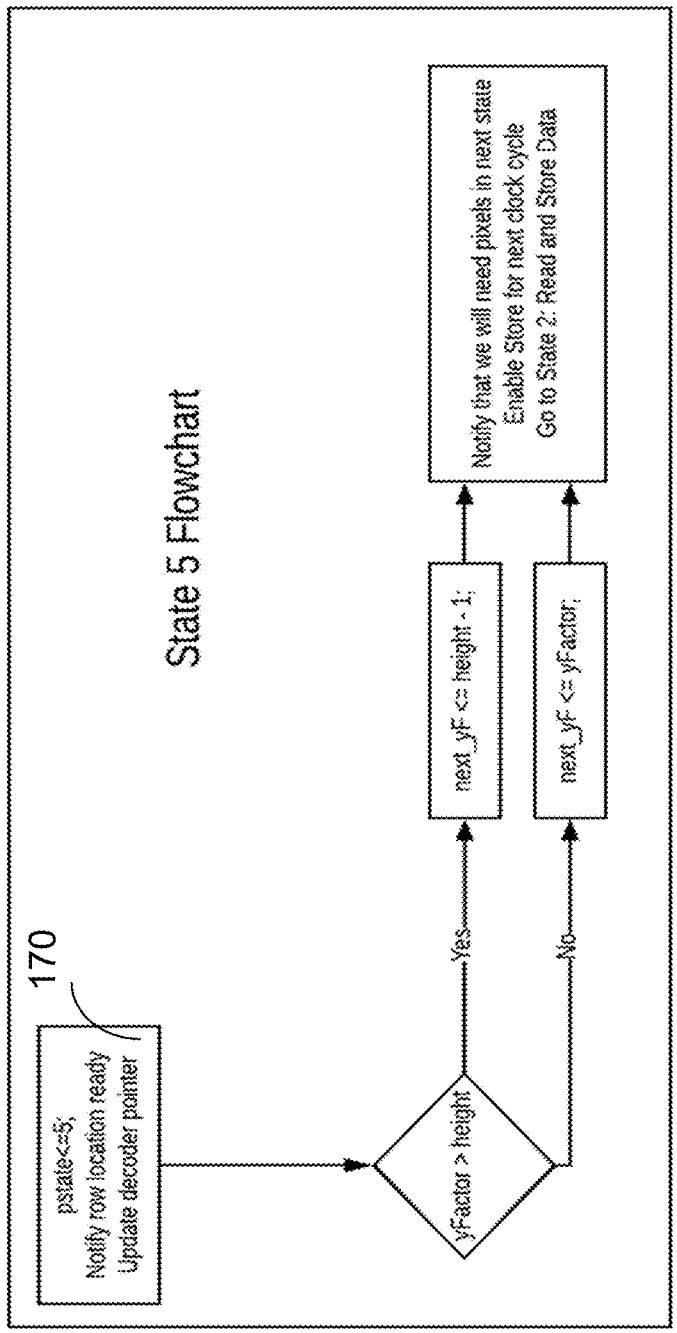
FIG. 10 shows a pixel smart memory module state 5 flowchart in accordance with the present disclosure.
Figure 11:
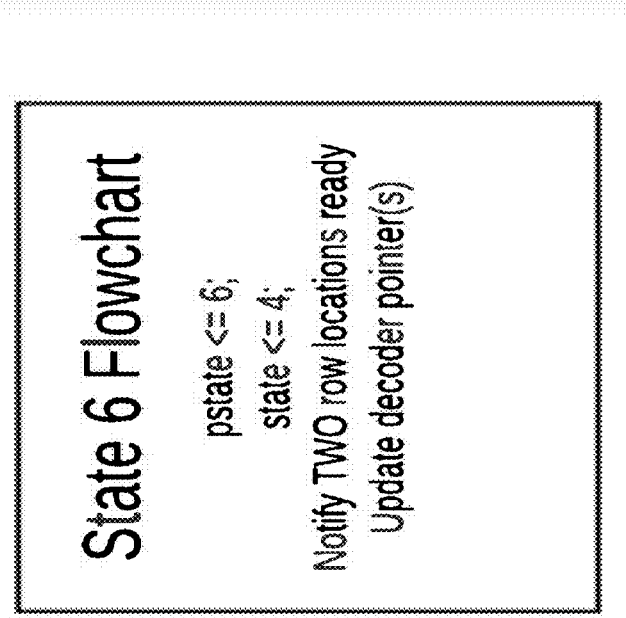
FIG. 11 shows a pixel smart memory module state 6 flowchart in accordance with the present disclosure.

State 5 and 6 take account of needed pixel rows that are already stored in the four BRAM sections 50, 52, 54 and 56. Knowing what pixel rows have already been stored allows the pixel smart memory module 22 to have the decoder 80 decode the address to point towards locations previously saved. State 5 does so knowing to point to just one pixel row previously saved into the four BRAM sections 50, 52, 54 and 56. However, in state 5 the second needed row is not stored in the four BRAM sections 50, 52, 54 and 56, therefore the state machine jumps to state 2 after adjusting the write address in step 170 so as to save the next pixel row into the four BRAM sections 50, 52, 54 and 56, as shown in the FIG. 10 state 5 flow chart. State 6 points to two pixel rows already saved in the four BRAM sections 50, 52, 54 and 56. The two needed rows are already saved so the decoder 80 decodes the address to point to the previously saved pixel rows, as shown in FIG. 11.

Figure 12:
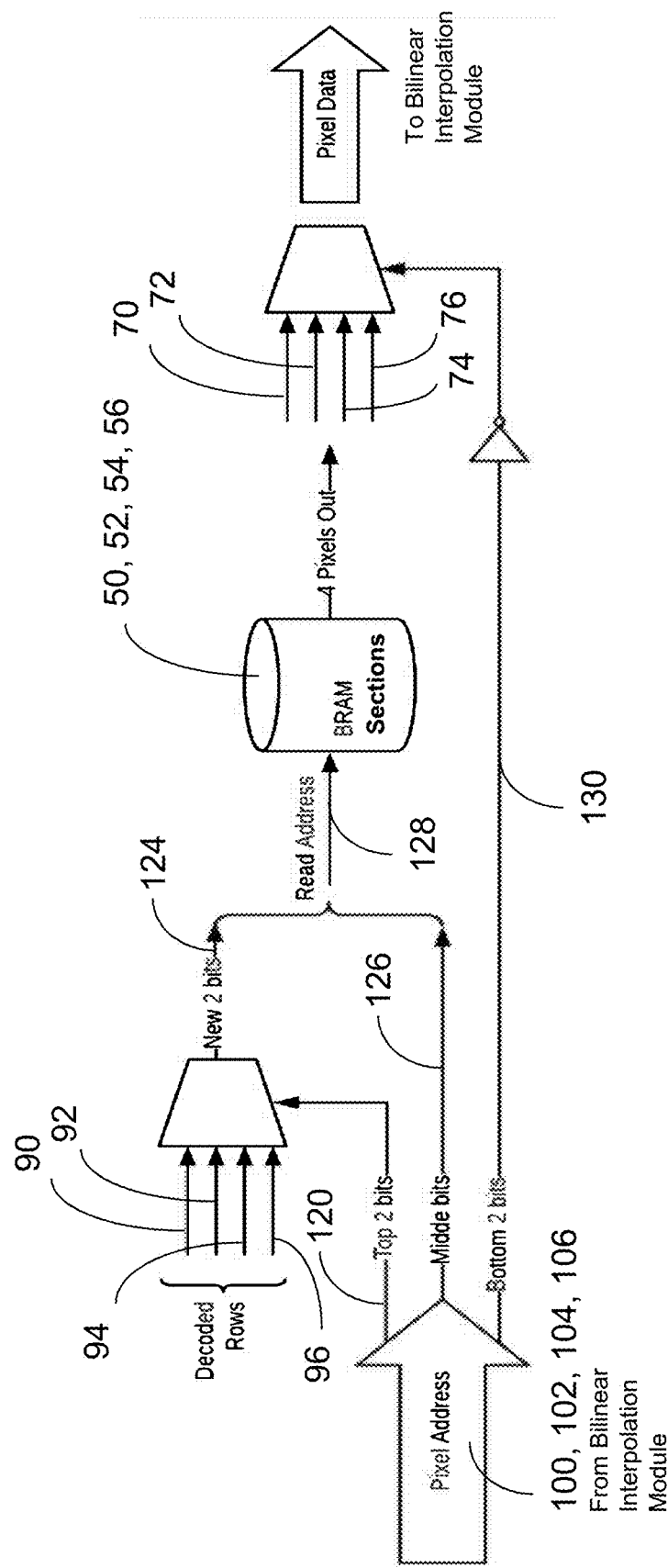
FIG. 12 shows a pixel smart memory module address decoder overview in accordance with the present disclosure.

The decoder 80, shown in FIG. 4, in the Pixel Smart Memory module receives the requested pixel read addresses 100, 102, 104 and 106 from the bilinear interpolation module 24, as shown in FIG. 2 and shown in more detail in FIG. 12. The requested pixel read addresses 100, 102, 104 and 106 from the bilinear interpolation module are addresses that assume that the entire image is being addressed. The decoder 80 decodes the correct decoded pixel rows 90, 92, 94 and 96 and using the top two bits 120 from the requested pixel read addresses 100, 102, 194 and 106, the decoder derives the correct two top bits 124. The decoder then replaces the top 2 bits 120 with the correct two bits 124, concatenating them to the middle bits 126 to derive the correct read address 128 to the image pixels in the four BRAM sections 50, 52, 54 and 56.

As shown in FIG. 12, the four BRAM sections 50, 52, 54 and 56 store 4 pixels in Little Endian order, so the bottom bits 130 of the requested pixel read addresses are inverted to address the correct pixels 70, 72, 74 and 76 to be read out and sent to the bilinear interpolation module 24, shown in FIG. 2.

The bilinear interpolation module 24 performs the interpolation of the pixel values in the original image to create new interpolated values that are saved in the BRAM Save/Send module 26. The bilinear interpolation calculation is very similar to Equation 1. A detailed flow chart for the bilinear interpolation calculation is shown in the flowchart in FIG. 13.

Figure 13:
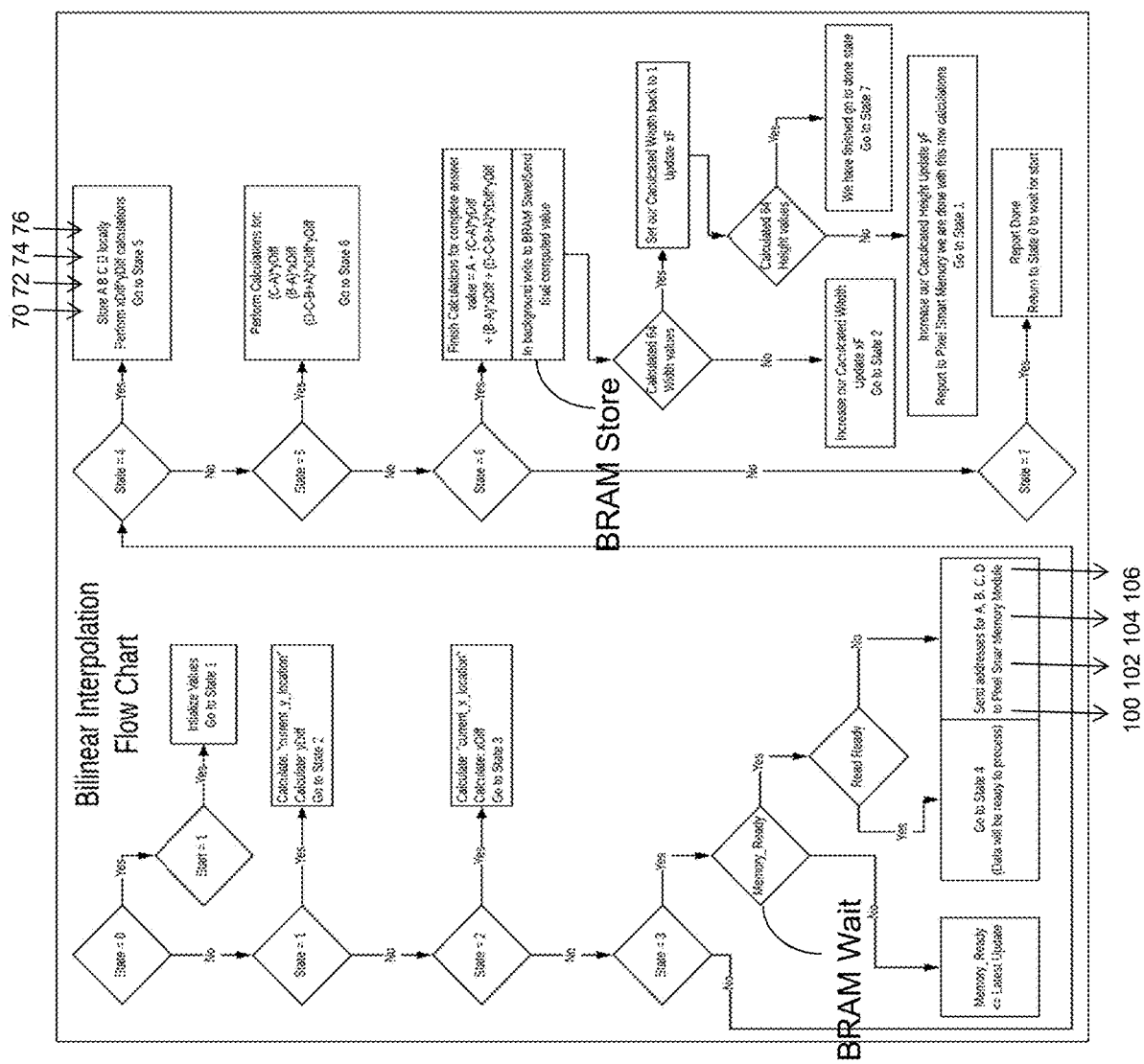
FIG. 13 shows a bilinear interpolation module flow chart in accordance with the present disclosure.

As seen in FIG. 13, one difference from the traditional bilinear interpolation of Equation 1, is the specific memory handling done to force the system to wait for BRAM section access (BRAM Wait), store into BRAM sections 50, 52, 54 and 56 for later reads (BRAM Store) and calculations by the hardware that stretch over a few clock cycles. The separation of calculations over a few clock cycles helps for designs which expect increases in pipeline clock speed, which may be yet to be specified. Also note that, as shown in FIG. 2, the bilinear interpolation module 24 communicates between the pixel smart memory module 22 and the BRAM Save/Send module 26, receiving values from BRAM sections 50, 52, 54 and 56 in the pixel smart memory module 22, performing the calculations, and storing the results into the BRAM Save/Send module 26.

Figure 14:
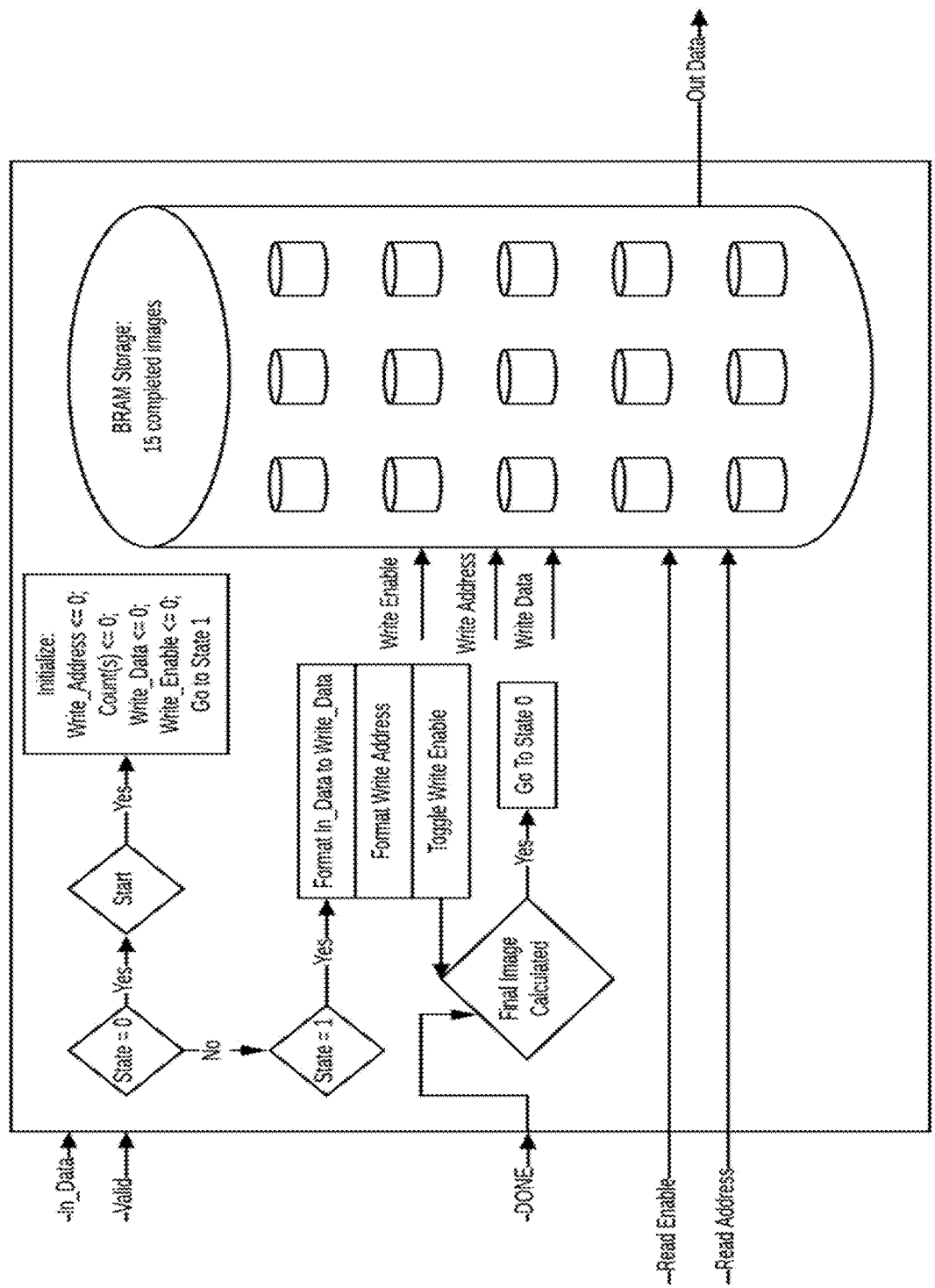
FIG. 14 shows a block diagram for the block random access memory (BRAM) in accordance with the present disclosure.

The BRAM Save/Send module 26 adjusts the format in which the saved pixel data is formatted, so that the Bilinear Interpolation System can read it correctly. The overall block diagram of the BRAM Save/Send module 26 is shown in FIG. 14.

The bilinear interpolation system has been implemented on a Kintex-7 FPGA. As described above the BRAM sections 50, 52, 54 and 56 and the BRAM save/send module 26 have been implemented in block random access memory. The BRAM sections 50, 52, 54 and 56 and the BRAM save/send module 26 may also be implemented in other forms of memory including random access memory.

Before the bilinear interpolation system is used, the image pipeline finds areas of interest through a bound box method, as shown in FIG. 15. The bounding box method finds, ranks and chooses the images, such as boxes 140 in FIG. 15, for the bilinear interpolation system to process.

Figure 16C:
FIGS. 16A, 16B and 16C show three cases of images found with the bounding box to be placed into the bilinear interpolation system in accordance with the present disclosure.
Figure 16B:
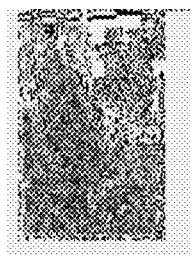
Figure 16A:
Figure 17C:
FIGS. 17A, 17B and 17C show results from the bilinear interpolation system.
Figure 17B:
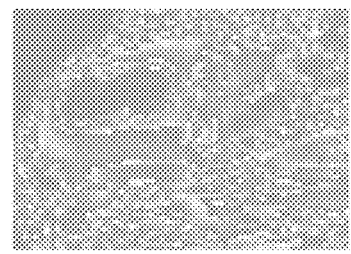
Figure 17A:
Figure 18C:
FIGS. 18A, 18B and 18C show results from the bilinear interpolation system.
Figure 18B:
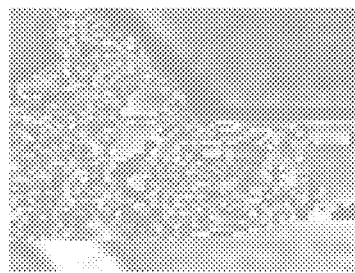
Figure 18A:
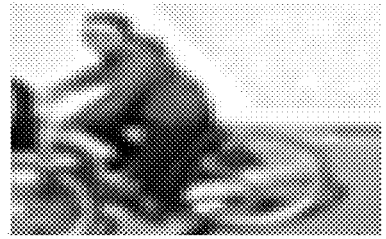
Figure 19C:
FIGS. 19A, 19B and 19C show results from the bilinear interpolation system.
Figure 19B:
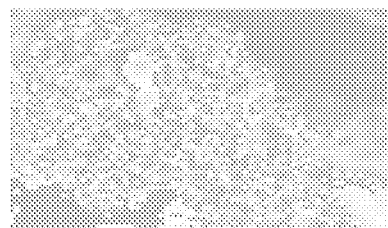
Figure 19A:

Once the areas of interest are identified, the image pipeline pushes these images through the Bilinear Interpolation System. FIGS. 16A, 16B and 16C show three images to be processed.

Notice that each of the photo images has a different dimension. The Bilinear Interpolation System takes these images and adjusts them to be the size of 64×64 pixels. The results using the interpolation hardware have been compared with simulations from Matlab. One important fact is that for the hardware implementation, the output from the bilinear interpolation is reduced to 3 bit pixels instead of the standard 8 bit pixels representation. This was an intentional limitation of the image pipeline hardware design and does not reflect on the bilinear interpolation system design which may be implemented to process the full bit width of the pixels. The bit reduction results in an average error of the hardware vs simulation of 12.5%, which is derived from the following calculation: $2^{(8-3)}/2^8=32/256$. The 12.5% error is exactly what is found when running an error test over the results, as shown in FIGS. 17A, 17B and 17C, 18A, 18B and 18C, and 19A, 19B and 19C. The bilinear interpolation system was run with an image processing pipeline and demonstrated a 30 frame per second processing speed.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A system for real time bilinear interpolation comprising:
    a bilinear interpolation module configured to:
        generate pixel addresses for original image pixels of an original image needed for performing bilinear interpolation of the original image to form a resized or resealed image, wherein the generated pixel addresses assume all the original image pixels of the original image are accessible; and
        perform bilinear interpolation of the original image pixels of the original image to form interpolated pixels for the resized or resealed image; and
    a pixel smart memory module configured to:
        sequentially receive original image pixel rows of the original image an original image pixel row at a time; and
        predict which original image pixel rows are needed for performing bilinear interpolation of the original image pixels of the original image to form interpolated pixels for the resized or resealed image;
        store only the needed sequentially received original image pixel rows in a memory;
        decode the generated pixel addresses to form decoded addresses to access the needed original image pixel rows stored in the memory; and
        send the needed original image pixel rows to the bilinear interpolation module for performing bilinear interpolation;
    wherein performing bilinear interpolation of the original image pixels of the original image to form interpolated pixels for a resized or resealed image comprises:
    deriving an interpolated new pixel at a location X,Y for the resized or resealed image by performing the calculation:

$$A(1-x\text{diff})(1-y\text{diff})+B(x\text{diff})(1-y\text{diff})+C(y\text{diff})(1-x\text{diff})+D(x\text{diff})(y\text{diff})=\text{NewPixel};$$

wherein NewPixel=pixel value at a resized image location X,Y;
    wherein A=pixel value at a location x,y in the original image;
    wherein B=pixel value at a location x+1,y in the original image;
    wherein C=pixel value at a location x,y+1 in the original image;
    wherein D=pixel value at a location x+1,y+1 in the original image;
    wherein X,Y is a coordinate of the pixel value for the resized or rescaled image;
    wherein x,y, x+1,y, x,y+1, x+1,y+1 are coordinates of pixels in the original image;
    wherein X_Factor=start width of the original image divided by the end width of the resized image;
    wherein Y_Factor=start height of the original image divided by the end height of the resized image;
    wherein x_F=X_Factor*X;
    wherein y_F=Y_Factor*Y;
    wherein x_original=min(floor(x_F), start width of original image−1), and the floor function rounds down to the nearest integer value;
    wherein y_original=min(floor(y_F), start height of original image−1), and floor function rounds down to the nearest integer value;
    wherein xdiff=x_F−x_original; and
    wherein ydiff=y_F−y_original.

2. The system of claim 1 wherein predicting which original image pixel rows are needed for performing bilinear interpolation of the original image pixels of the original image to form interpolated pixels for the resized or rescaled image comprises:
    determining that an original image pixel row expected to next stream in is for a needed original image pixel row, and storing the original image pixel row expected to next stream in into the memory;
    determining that an original image pixel row expected to next stream in is not for a needed original image pixel row, and not storing the original image pixel row expected to next stream in into the memory;
    determining that a needed original image pixel row is already stored in memory, and retaining the already stored needed original image pixel row in memory; or
    determining that a first and a second needed original pixel rows are already stored in memory, and retaining the already stored first and second needed original image pixel rows in memory.

3. The system of claim 1 wherein the memory comprises:
four memories, each memory having a write port and a read port.

4. The system of claim 3 wherein the four memories each comprise a block random access memory.

5. The system of claim 3 wherein storing only the needed sequentially received original image pixel rows in a memory comprises storing a needed original image pixel row into identical addresses in each of the four memories.

6. The system of claim 1 further comprising a second memory for storing bilinear interpolated pixels for the resized or resealed image.

7. The system of claim 6 wherein the second memory comprises a block random access memory.

8. The system of claim 1 further comprising a logic module configured to:
turn off one or more clocks for the system for real time bilinear interpolation to save power.

9. The system of claim 8 wherein turning off one or more clocks for the system for real time bilinear interpolation to save power comprises:
turning off one or more clocks to the bilinear interpolation module when calculations are not needed.

10. The system of claim 1 wherein decoding the generated pixel addresses to form decoded addresses to access the needed original image pixel rows stored in the memory further comprises:
replacing two top bits of each generated pixel address with two top bits of the decoded addresses.

11. A method for real time bilinear interpolation comprising:
generating pixel addresses for original image pixels of an original image needed for performing bilinear interpolation of the original image to form a resized or rescaled image, wherein the generated pixel addresses assume all the original image pixels of the original image are accessible;
sequentially receiving original image pixel rows of the original image an original image pixel row at a time;
predicting which original image pixel rows are needed for performing bilinear interpolation of the original image pixels of the original image to form interpolated pixels for the resized or rescaled image;
storing only the needed sequentially received original image pixel rows in a memory;
decoding the generated pixel addresses to form decoded addresses to access the needed original image pixels rows stored in the memory;
accessing from the memory the needed original image pixel rows; and
performing bilinear interpolation on the accessed needed original image pixel rows to form interpolated pixels for the resized or rescaled image;
wherein performing bilinear interpolation of the original image pixels of the original image to form interpolated pixels for a resized or rescaled image comprises:
deriving an interpolated new pixel at a location X,Y for the resized or rescaled image by performing the calculation:

$$A(1-x\text{diff})(1-y\text{diff})+B(x\text{diff})(1-y\text{diff})+C(y\text{diff})(1-x\text{diff})+D(x\text{diff})(y\text{diff})=\text{NewPixel};$$

wherein NewPixel=pixel value at a resized image location X,Y;
wherein A=pixel value at a location x,y in the original image;
wherein B=pixel value at a location x+1,y in the original image;
wherein C=pixel value at a location x,y+1 in the original image;
wherein D=pixel value at a location x+1,y+1 in the original image;
wherein X,Y is a coordinate of the pixel value for the resized or rescaled image;
wherein x,y, x+1,y, x,y+1, x+1,y+1 are coordinates of pixels in the original image;
wherein X_Factor=start width of the original image divided by the end width of the resized image;
wherein Y_Factor=start height of the original image divided by the end height of the resized image;
wherein x_F=X_Factor*X;
wherein y_F=Y_Factor*Y;
wherein x_original=min(floor(x_F), start width of original image−1), and the floor function rounds down to the nearest integer value;
wherein y_original=min(floor(y_F), start height of original image−1), and floor function rounds down to the nearest integer value;
wherein xdiff=x_F—x_original; and
wherein ydiff=y_F—y_original.

12. The method of claim 11 wherein predicting which original image pixel rows are needed for performing bilinear interpolation of the original image pixels of the original image to form interpolated pixels for the resized or rescaled image comprises:
determining that an original image pixel row expected to next stream in is for a needed original image pixel row, and storing the original image pixel row expected to next stream in into the memory;
determining that an original image pixel row expected to next stream in is not for a needed original image pixel row, and not storing the original image pixel row expected to next stream in into the memory;
determining that a needed original image pixel row is already stored in memory, and retaining the already stored needed original image pixel row in memory; or
determining that a first and a second needed original pixel rows are already stored in memory, and retaining the already stored first and second needed original image pixel rows in memory.

13. The system of claim 11 wherein the memory comprises:
four memories, each memory having a write port and a read port.

14. The method of claim 13 wherein storing only the needed sequentially received original image pixel rows in a memory comprises storing a needed original image pixel row into identical addresses in each of the four memories.

15. The method of claim 11 further comprising storing bilinear interpolated pixels for the resized or rescaled image into a second memory.

16. The method of claim 11 further comprising turning off one or more clocks to the bilinear interpolation when calculations are not needed.

17. The method of claim 11 wherein decoding the generated pixel addresses to form decoded addresses to access the needed original image pixel rows stored in the memory further comprises:
replacing two top bits of each generated pixel address with two top bits of the decoded addresses.

\* \* \* \* \*